United States Patent
Iannaccone et al.

(10) Patent No.: US 9,922,436 B2
(45) Date of Patent: Mar. 20, 2018

(54) SYSTEM AND METHOD FOR PRESENTING DYNAMIC VISUALIZATIONS

(71) Applicant: ROYAL BANK OF CANADA, Montreal (CA)

(72) Inventors: Philip Iannaccone, New York, NY (US); Walter Michael Pitio, Morganville, NJ (US); James Brown, New York, NY (US)

(73) Assignee: ROYAL BANK OF CANADA, Montreal (CA)

( * ) Notice: Subject to any disclaimer, the term of this patent is extended or adjusted under 35 U.S.C. 154(b) by 0 days.

(21) Appl. No.: 15/284,440

(22) Filed: Oct. 3, 2016

(65) Prior Publication Data

US 2017/0098318 A1 Apr. 6, 2017

Related U.S. Application Data

(60) Provisional application No. 62/235,858, filed on Oct. 1, 2015.

(51) Int. Cl.
*G06T 11/20* (2006.01)
*G06F 3/0482* (2013.01)

(52) U.S. Cl.
CPC .......... *G06T 11/206* (2013.01); *G06F 3/0482* (2013.01); *G06T 2200/24* (2013.01)

(58) Field of Classification Search
None
See application file for complete search history.

(56) References Cited

U.S. PATENT DOCUMENTS

| | | |
|---|---|---|
| 2004/0001092 A1 | 1/2004 | Rothwein et al. |
| 2004/0085316 A1 | 5/2004 | Malik |
| 2004/0174397 A1 | 9/2004 | Cereghini et al. |
| 2006/0101324 A1 | 5/2006 | Goldberg et al. |
| 2008/0273421 A1* | 11/2008 | Koren ............ G01V 1/301 367/11 |
| 2015/0081701 A1 | 3/2015 | Lerios et al. |

OTHER PUBLICATIONS

WIPO, Written Opinion and International Search Report for PCT Application No. PCT/CA2016/051150 dated Dec. 6, 2016.

* cited by examiner

*Primary Examiner* — Michelle Chin
(74) *Attorney, Agent, or Firm* — Norton Rose Fulbright Canada LLP

(57) ABSTRACT

The present disclosure relates to data management. More particularly, the present disclosure relates to visualizing data and/or navigating visualized data. In one aspect, a computer-implemented method for dynamically presenting graphical and textual information in a graphical user interface is configured to: display graphical user interface elements visually representing a data set stored in memory along at least one dimension of a graphical user interface; receive activation signals generated by user input devices and corresponding to at least one dimension of the displayed graphical user interface; and, upon receiving an activation signal, display at least a portion of the data set based on the position at which the activation signal was received.

19 Claims, 10 Drawing Sheets

FIG. 5

SYSTEM AND METHOD FOR PRESENTING DYNAMIC VISUALIZATIONS

CROSS-REFERENCE TO RELATED APPLICATIONS

This application claims all benefit, including priority, of U.S. patent application No. 62/235,858, filed Oct. 1, 2015, and entitled "SYSTEM AND METHOD FOR PRESENTING DYNAMIC VISUALIZATIONS". This document is hereby incorporated by reference in its entirety.

FIELD

The present disclosure relates to data management. More particularly, the present disclosure relates to visualizing data and/or navigating visualized data.

BACKGROUND

Management of large volumes of data received from a variety of sources may be problematic from the perspective of conducting analyses on said data. Further, as more and more industries begin to generate, trade, and rely on large amounts of data, thus creating increasingly vast data sets, it becomes increasingly difficult for users to identify particular trends and patterns within those data sets.

Analytics, the identification, interpretation, analysis, and communication of meaningful patterns from within data sets, is becoming increasingly important in many industries and applications and may produce very large amounts of data either for a single point in time, or over a period of time. However, now that data sets containing billions of values or more have become common, visualizing and navigating large data sets can be a challenge.

SUMMARY

Aspects of the present disclosure provide systems, methods, and computer-executable instruction mechanisms (e.g., non-transient machine-readable programming structures) such as software-coded instruction sets and data, for the presenting of dynamic visualizations of data sets.

In particular, for example, some embodiments of the present disclosure provide systems, methods and coded instruction sets useful for the visualization of large sets of data, the arrangement of sub-sets of data within such larger sets or association of portions of large sets of data into useful combinations, and/or visualization of such sub-sets or associated sub-sets of data.

In accordance with one aspect, there is provided a computer-implemented method for dynamically presenting graphical and textual information in a graphical user interface. The method comprises: displaying a graphical user interface element along a dimension of the graphical user interface, the graphical user interface element visually representing a data set stored in memory; receiving an activation signal at a position along the dimension of the graphical user interface element; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a graphical user interface element along a dimension of the graphical user interface, the graphical user interface element visually representing a data set stored in memory; receiving an activation signal at a position along the dimension of the graphical user interface element; receiving the data set stored in memory; generating an arranged data set based on at least an attribute of the received data set to be associated with the location upon the graphical user interface element where the activation signal was received; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a graphical user interface element along a dimension of the graphical user interface, the graphical user interface element visually representing a data set stored in memory; receiving an activation signal at a position along the dimension of the graphical user interface element; associating portions of the data set with portions of the graphical user interface; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a graphical user interface element along a dimension of the graphical user interface, the graphical user interface element visually representing a data set stored in memory; receiving an activation signal at a position along the dimension of the graphical user interface element; associating portions of the data set with portions of the graphical user interface; generating portion display data associated with respective portions of the data set, the portion display data associated with respective portions of the graphical user interface element; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying the graphical user interface element along the first dimension and a second dimension of the graphical user interface, the graphical user interface element visually representing a data set stored in memory; receiving an activation signal at a position along the first dimension and the second dimension of the graphical user interface element; and upon receiving the activation signal, displaying at least the portion of the data set based on the position along the first dimension and the position along the second dimension at which the activation signal was received.

In accordance with another aspect, there is provided a computer-implemented method for dynamically presenting graphical and textual information in a graphical user interface. The method comprises: displaying the graphical user interface element along the first dimension and a second dimension of the graphical user interface, the graphical user interface element visually representing a data set stored in memory; receiving an activation signal at a position along the first dimension and the second dimension of the graphical user interface element; receiving the data set stored in memory; generating an arranged data set based on at least two attributes of the received data set, each of the at least two attributes to be associated with at least one of the first dimension or the second dimension of the graphical user interface element; and upon receiving the activation signal, displaying at least the portion of the data set based on the position along the first dimension and the position along the second dimension at which the activation signal was received.

In accordance with another aspect, there is provided a computer-implemented method for dynamically presenting graphical and textual information in a graphical user interface. The method comprises: displaying a flow bar of a Sankey diagram, the graphical user interface element visually representing a data set stored in memory; receiving an activation signal at a position along the flow bar; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a flow bar of a Sankey diagram representing a data set stored in memory; receiving an activation signal at a position along the curve flow bar; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a flow bar of a Sankey diagram representing a data set stored in memory; receiving an activation signal at a position along the curve and the width of the flow bar; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a circle chart along a dimension of the graphical user interface, the circle chart visually representing a data set stored in memory; receiving an activation signal at a position along the dimension of the circle chart; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a bubble chart along a dimension of the graphical user interface, the bubble chart visually representing a data set stored in memory; receiving an activation signal at a position along the dimension of the bubble chart; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a line graph along a dimension of the graphical user interface, the line graph visually representing a data set stored in memory; receiving an activation signal at a position along the dimension of the line graph; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a bar graph along a dimension of the graphical user interface, the bar graph visually representing a data set stored in memory; receiving an activation signal at a position along the dimension of the bar graph; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a graphical user interface element representing a Cartesian coordinate system on a dimension of the graphical user interface, the graphical user interface element visually representing a data set stored in memory; receiving an activation signal at a position along the dimension of the graphical user interface element; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a graphical user interface element representing a polar coordinate system on a dimension of the graphical user interface, the graphical user interface element visually representing a data set stored in memory; receiving an activation signal at a position along the dimension of the graphical user interface element; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a graphical user interface element along a dimension of the graphical user interface, the graphical user interface element visually representing a data set stored in memory; receiving an activation signal at a position along the dimension of the graphical user interface element; receiving a second activation signal at a second position along the first dimension of the graphical user interface element; upon receiving the activation signal, displaying at least a portion of the data set based on the position at which the activation signal was generated; and displaying a second graphical user interface element, the second graphical user interface element visually representing at least a portion of associated with the second position along the first dimension at which the second activation signal was received.

In accordance with another aspect, there is provided a computer-implemented method for dynamically presenting graphical and textual information in a graphical user interface. The method comprises: displaying a graphical user interface element along a dimension of the graphical user interface, the graphical user interface element visually representing a data set stored in memory; receiving an activation signal at a position along the dimension of the graphical user interface element; receiving the data set stored in memory; generating an arranged data set based on at least on attribute of the received data set to be associated with the location upon the graphical user interface element where the activation signal was received; storing at least one attribute of the arranged data set in memory; and upon receiving the activation signal, displaying at least a portion of the data set based on the position at which the activation signal was generated.

In accordance with another aspect, there is provided a computer-implemented method for dynamically presenting graphical and textual information in a graphical user interface. The method comprises: displaying a graphical user interface element along a dimension of the graphical user interface, the graphical user interface element visually representing a data set stored in memory; receiving an activation signal at a position along the dimension of the graphical user interface element; receiving the data set stored in memory; generating an arranged data set based on at least on attribute of the received data set from the data set stored in memory; storing at least one attribute of the arranged data set in memory; and upon receiving the activation signal, displaying at least a portion of the data set based on the position at which the activation signal was generated.

In accordance with another aspect, there is provided a computing device configured for dynamically presenting graphical and textual information in a graphical user interface, the device comprising: user interface components configured to convey output signals and to receive input signals; computer memory; and at least one processor configured to execute instructions to provide a data transformation engine and a data presentation engine, the data transformation engine configured to: receive input signals from the data presentation engine; associate the received input signals with one or more values in a data set stored in memory; automatically generate an arranged data set based on values associated with the input signal. The data presentation engine configured to: receive the input signals from the user interface components; associate the input signals from the user interface components with at least one element of the data visualizations; transmit input signals from user interface components to the data transformation engine; receive the arranged data set from the data transformation engine; automatically generate one or more data visualizations based on the arranged data set received from the data transformation engine; and transmit the data visualizations to the user interface components configured to convey output signals input signals.

In accordance with another aspect, a computing device configured for dynamically presenting graphical and textual information in a graphical user interface. The computing device includes: user interface components configured to convey output signals and to receive input signals; computer memory; and, at least one processor configured to execute instructions to provide a data transformation engine and a data presentation engine. The data transformation engine is configured to: receive input signals from the data presentation engine; associate the received input signals with one or more values in a data set stored in memory; automatically generate an optimized data set based on at least one of the values from among the data set stored in memory and the arranged data set; store the optimized data set in memory; and, automatically generate an arranged data set based on values associated with the input signal.

In reference to the example aspect of the previous paragraph, the data presentation engine is configured to: receive the input signals from the user interface components; associate the input signals from the user interface components with at least one element of data represented by the data visualizations; transmit input signals from user interface components to the data transformation engine; receive the arranged data set from the data transformation engine; automatically generate one or more data visualizations based on the arranged data set received from the data transformation engine; and transmit the data visualizations to the user interface components configured to convey output signals input signals.

In accordance with another aspect, a computing device configured for dynamically presenting graphical and textual information in a graphical user interface is provided. The computing device comprises: user interface components configured to convey output signals and to receive input signals; computer memory; and at least one processor configured to execute instructions to provide a data transformation engine and a data presentation engine, the data transformation engine configured to: receive input signals from the data presentation engine; associate the received input signals with one or more values in a data set stored in memory; automatically generate an optimized data set based on at least one of the values from among the data set stored in memory and the arranged data set; store the optimized data set in memory; automatically retrieve a list of optimized data from the optimized data set; determine whether the output of any instruction in the first pre-programmed instruction set are already stored in the optimized data set; import any values in the optimized data set corresponding to the output of any instruction in the first pre-programmed instruction set into the arranged data set; execute any instructions in the first pre-programmed instruction set, the output of which has not been imported into the arranged data set; and, automatically generate an arranged data set based on values associated with the input signal.

In reference to the example aspect of the previous paragraph, the data presentation engine is configured to: receive the input signals from the user interface components; associate those input signals with at least one element of the data visualizations; transmit said input signals from user interface components to the data transformation engine; receive the arranged data set from the data transformation engine; automatically generate one or more data visualizations based on the arranged data set received from the data transformation engine; and transmit the data visualizations to the user interface components configured to convey output signals and input signals.

In accordance with another aspect, there is provided a non-transitory computer-readable medium storing machine-interpretable instructions, the machine-interpretable instructions, when executed by a processor coupled to a data storage, cause the processor perform a method. This method comprises: displaying a graphical user interface element along a first dimension (for example the first dimension may refer to the horizontal width of a displayed element as displayed on the graphical user interface) of the graphical user interface, the graphical user interface element visually representing a data set stored in memory; receiving an activation signal at a position along the first dimension of the graphical user interface element; and, upon receiving the activation signal, displaying at least a portion of the data set based on the position along the first dimension at which the activation signal was received.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 5 illustrates a graphical user interface for visualization of data according to some embodiments.

DETAILED DESCRIPTION

Figure 1:
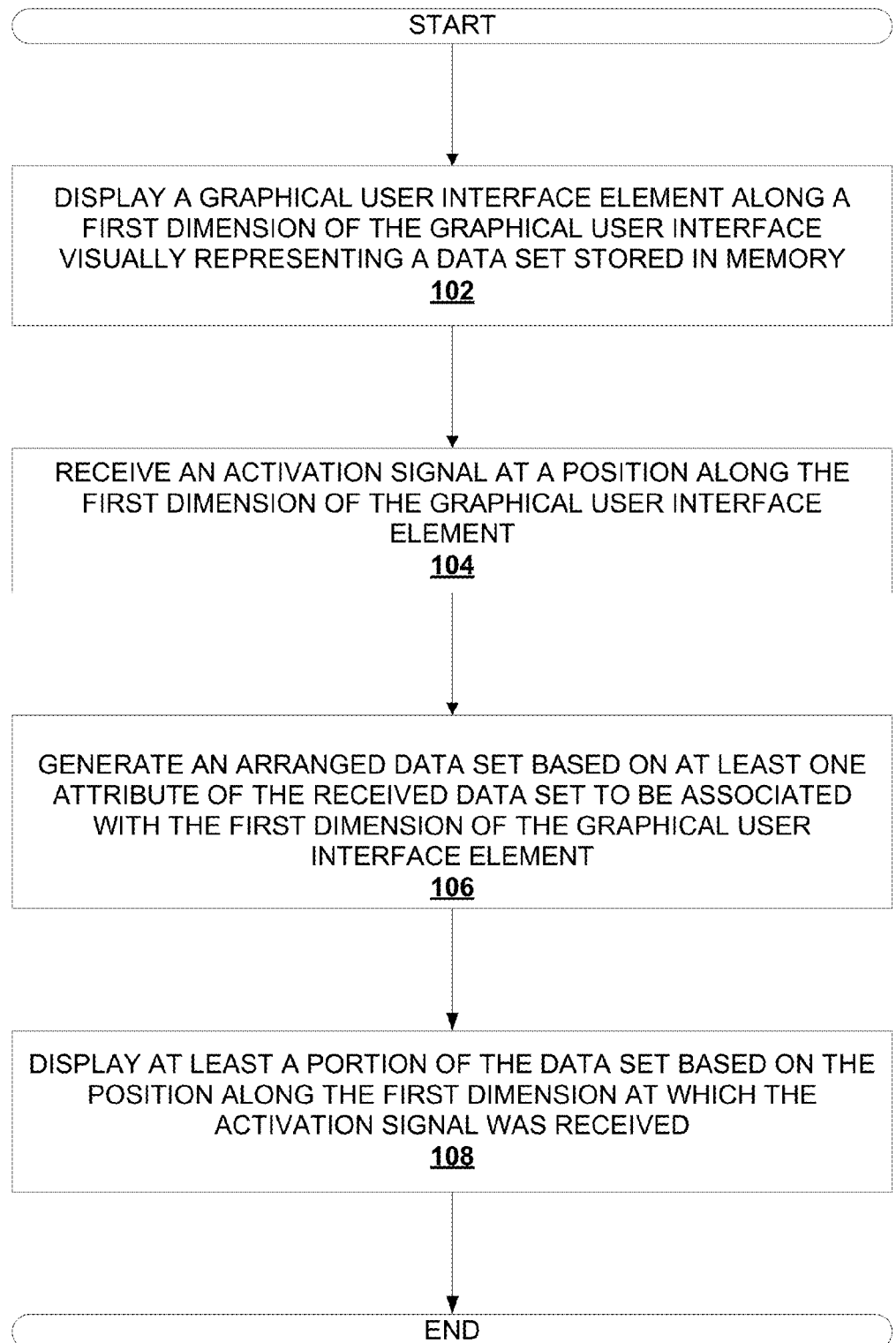
FIG. 1 depicts a method for presenting dynamic visualizations according to some embodiments.

Although existing graphical user interfaces may effectively present limited amounts of information to users such that said users may effectively identify important values and trends therein, a problem exists in that said existing graphical user interfaces are ineffective at presenting large amounts of data while also enabling users to identify said important values and trends in smaller data subsets therein. In some situations, some embodiments of the instant application may provide a method of quickly and automatically visualizing both large data sets as well as important subsets of data therein.

It may be possible to create one or more visualizations of the data, such as various charts or graphs, in order to view or express certain aspects of the data. Certain values within a large data set may, when presented in conjunction with one another, reveal valuable insights to viewers. New visualizations and/or visualization interfaces may offer improvements in some instances.

Large data sets may be pre-existing, may have been produced, created, generated, tracked, or stored in the course of an operation or enterprise in one or more databases stored on one or more computers. Large data sets are frequently generated by analytics endeavours, such as, for example, in tracking movement or other activities of people or things. Often, such large data sets are not limited to a finite period of time and, thus, continue to grow as the tracked values change over time. The value of such analytical data is in being able to quantify aspects of the data in order to identify trends, and/or to draw conclusions therefrom.

Manually looking through data records may be very time consuming for a person. Particularly where millions, billions, or more distinct data records may be created daily and where data records may be continuously created in real-time, it may be impossible for a person to accurately, reliably, and/or simply search through data records in order to identify important data. A computer could be programmed to query a database of the tracked data to locate data records that satisfy particular conditions, but those conditions would have to be known in advance. In many cases, it may not be possible to know in advance which particular conditions may produce valuable combinations of data records in advance. In other words, it may not be possible for a user to realize that a valuable combination exists until they see it.

In accordance with the present disclosure, there are provided methods, systems, and machine-executable instruction logic for presenting dynamic visualizations of data sets. There may be provided a computer system comprising a display, an input device (e.g., mouse, trackball, touchscreen, etc.), and one or more data processors coupled to a memory containing computer processing instructions. The computer system may include one or more client or server computers in communication with one another over a near-field, local, wireless, wired, or wide-area computer network, such as the Internet. The one or more computer servers may include local, remote, cloud based or software as a service platform (SAAS) servers.

FIG. 1 is an illustrative method of dynamically presenting visual information in a graphical user interface according to some embodiments.

Current graphical user interfaces for displaying large data sets may provide graphical representations of the data within those data sets. However, it is now common for such data sets to contain millions or billions of data points or more, and such data sets often contain multitudinous types of data. Since graphical user interfaces for displaying large sets of data do not provide means for users to quickly visualize or navigate subsets of data therein, users of current graphical interfaces for displaying large data sets may require multiple systems; some to visualize large portions of data and other separate systems for viewing smaller subsets of data within larger data sets. This is a technical challenge for systems seeking to effectively present such data sets.

With reference to the method flow chart of FIG. 1, some embodiments may provide for a system to present a graphical user interface presenting visualizations of large data sets and to dynamically generate and display visualizations of subsets of data based on user input signals.

At 102, a graphical user interface element is displayed on a display device. The graphical user interface element can be at least a portion of a graphical user interface, and in some embodiments, can visually represent at least one element of a data set stored in memory. For example, in some embodiments, a graphical user interface element can be one or more aspects of a graph or other visual representation of data. For example, in some embodiments, a graphical user interface element can include at least a portion of a bar graph, Sankey diagram, line graph, pie chart, and/or any other graphical representation of data.

In some embodiments, the graphical user interface (GUI) element is displayed along one, two or more dimensions of the graphical user interface. For example, a bar graph GUI element can be displayed along a horizontal direction/axis and/or a vertical direction/axis.

In another example, a GUI element may include an arrow or flow portion of a Sankey diagram and may be displayed along one or more non-linear dimensions which may follow the shape of a curved flow path.

In another example, a GUI element may be displayed along Cartesian, or polar dimensions. Any other suitable dimensions may also be used.

In some embodiments, one or more dimensions of the displayed GUI element is based on the magnitude or other aspect(s) of the corresponding data set. For example, in a Sankey flow diagram, a flow may be displayed having a relative thickness based on the relative flow volume for that particular flow. For example, a larger flow value for one GUI element (e.g. flow arrow) will cause the GUI element to be displayed thicker than another GUI element associated with a smaller flow value.

In some embodiments, the graphical user interface element may represent the volume of orders flowing from a particular stock brokerage to a particular exchange over a span of time. The graphical user interface element, according to some embodiments, may be displayed over a range of first and/or second positions (e.g., vertical, horizontal, or depth positions) along the contours of a line graph, the objects and connections of a Sankey diagram, and/or the circles and slices of a pie chart.

At 104, an activation signal is received at one or more positions corresponding to the presented graphical user interface element. In some embodiments, the graphical user interface element may comprise a line graph rendered on the display panel of a computing device. The activation signal may, as a non-limiting example, be received when an input or sequence of inputs from one or more input devices causes a cursor to stop or hover over a position on the graphical user interface element.

In another example, an activation signal may be received when an input such as a mouse click, a touch screen press (or force press), a swipe or other gesture, etc. is received at a position on the graphical user interface element. The activation signal may be transmitted through one or more user input devices through one or more computer buses and may be stored in memory before being transmitted to a microprocessor. Upon receipt of the activation signal by the microprocessor, one or more data elements relating to the activation signal (e.g., position on the graphical user interface, period of the signal, type of signal, time signal was generated, any pattern of signals the received signal may belong to, etc.) may be processed according to pre-programmed computer instructions.

At 106, one or more processors may generate an arranged data set from at least a portion of a data set stored in memory, at least one element of said data set being represented by the graphical user interface element.

In some embodiments, generating the arranged data set includes arranging the data set so that an associated portion of the data set can be displayed in real time, near-real time or otherwise with little user-perceptible delay when an activation signal is received.

In some embodiments, generating the arranged data set can include one or more transformative processes such as reordering, grouping, averaging, statistically manipulation, reformatting, combining with data not stored in the original data set, and/or arranging the data set so it can be accessed and/or displayed more quickly than in its original form.

In some embodiments, generating the arranged data set may include removing one or more fields which may not be required in the arranged data set. In some instances, this may increase the speed at which the arranged data may be accessed and/or displayed, and/or decrease the amount of memory to store or buffer the arranged data.

In some embodiments, the arranged data set is generated based on a first dimension of the graphical user interface element. For example, arranged data can be grouped based on the magnitude and/or granularity of a graphical user interface element dimension. For example, each arranged data grouping can correspond to one or more positions along the first dimension.

In some embodiments, the number of groupings and/or the amount of data set data included in a grouping may depend on the size of the data set and the magnitude and/or granularity of the graphical user interface element dimension. If the dimension is larger (e.g. 1000 pixels long vs. 50 pixels long) or has more granular divisions (e.g. division is 5 pixels vs. 20 pixels), the arranged data set may involve a larger number of groupings. Conversely, if the dimension is smaller in magnitude, or has less granular divisions, the arranged data set may involve a smaller number of groupings. In some embodiments, the dimension characteristics may be dependent on the user interface size (e.g. pixels, actual display dimensions of a window or other use interface), the display size (e.g. pixels, actual display dimensions), the sensor granularity (e.g. a mouse or touchscreen sensor granularity, such as sensor dots per inch, etc.).

In some embodiments, generating the arranged data set can include averaging, or otherwise accumulating portions of the data set corresponding to different groupings. In some instances, this may eliminate or minimize any processing required to access or display the arranged data. In some embodiments, generating the arranged data set can include associating portions of the data set with corresponding location(s) of the graphical user interface element(s).

In some embodiments, the dimension of the graphical user interface element can correspond to at least one attribute of the data set. For example, the dimension may correspond to time, a volume or other quantity, etc. In some embodiments, generating the arranged data set may include sorting the data based on the one or more attributes.

In some instances, an arranged data set may include a number of portions of the data set which include one or more values from the data set (e.g., portion data display corresponding to a more detailed zoomed-in view of smaller portion of a larger data set). The arranged data set may correspond in some fashion to the value within the data set represented by the graphical user interface element, and particularly may correspond to a data point or subset of data which is represented at a location (or locations) on the graphical user interface element corresponding to the location (or the locations) where the activation signal was generated.

In some examples, a location corresponding to a portion of the arranged data set may refer to a single location or a range/area of the graphical user interface element.

In an embodiment of a line graph graphical user interface element representing a brokerage's trading activity, the amount of shares, percentage of a total order represented by that amount of shares, and the time of the original request may be the portion of data displayed. The activation signal that caused this information to be displayed may be a mouse cursor that was hovered above a portion of a line graph which visualized the brokerage's trading activity during a particular month. It will be noted that the activation city is not limited to the hovering or clicking of a mouse cursor but may also refer to other means of selecting portions of graphical user interfaces (e.g., trackball, touchscreen, graphics tablet, microphone, keyboard, etc.).

The arranged data set may not be limited to simply a subset of values, perhaps of varying in type and character, from within the larger body of data stored in memory. The arranged data set may also include data from the larger body of stored data which need not be locally stored, and that, in addition to being related to the data represented at the location of the activation signal, may have undergone one or more data analytics processes, calculations, comparisons, manipulations, organizations, orderings, arrangements, transformations, etc. In some embodiments, generating the arranged data set can include mapping or otherwise relating one or more of the values of the data set to other values in the data set, and/or data external to the data set.

The arranged data set may also refer to a set of data that has been arranged or organized to optimize the speed at which certain data may be displayed. For example, such optimizations may be useful where a data set stored in memory contains data that was collected continuously over a period of days, and where a graphical user interface element may present said data set in sequence according to the day it was collected. In such a scenario, the received activation signal may take the form of a mouse cursor hovered-over a portion of a graph corresponding to a particular point or segment of time within a particular day. In such a scenario, the arranged data set may include pre-calculated tables of data stored in memory in one or more sequential files and an index table that points to the specific locations within said files corresponding to data collected on certain days or at certain times of day. Such an arranged data set may enable quicker access, processing and display of data within larger data sets that corresponds to received activation signals.

In some embodiments, the generation of the arranged data set may occur before, after or concurrently with the display of the graphical user interface element. In some embodiments, the generation of the arranged data set may be performed dynamically based on the size of a display and/or graphical user interface. For example, if a window (graphical user interface) is resized, the arranged data set may be regenerated.

In some embodiments, some aspects of the generation of the arranged data can be performed at different times. For example, when the generation involves sorting and apportioning, the sorting process can be performed earlier (e.g. whenever the data is received) as it may not be dependent on the graphical user interface. Once sorted, the apportioning process in generating the arranged data set can be performed when a display size or graphical user interface element dimensions are discovered/defined/updated by the device. In some embodiments, this phased approach may reduce the amount of time to generate the arranged data set after a user interface element dimensions are identified.

In some embodiments, the graphical user interface element can be displayed along two or more dimensions each of which are associated with one or more attributes of the data set. For example, two dimensions can include a position along the length of a line or curve, and a position along the width or thickness of the line or curve. In another example, two dimensions can include radial and angular positions.

In some embodiments, generating the arranged data set may include grouping the data set based on two or more dimensions. In some embodiments, generating the arranged data set can include grouping the data based on two or more attributes associated with the dimensions. For example, a distance along the length of a line or curve can be associated with a time, while a distance along the width or thickness of the line or curve can be associated with a volume or quantity of the flow.

In another example, two or more dimensions can be associated with the same attribute. For example, a distance along the length of a line or curve can be associated with a longer time period (e.g. hours or days), while a distance along the width or thickness of the line or curve can be associated with a short time period (e.g. minutes or hours).

As described herein or otherwise, the arranged data sets can be generated to include portions of data ready to be displayed in association with these multiple dimensions. For example, in a Cartesian coordinate system, the portions of data can be arranged in an array or similar format that corresponds to the grid-like locations of the graphical user interface element(s). Other suitable coordinate systems and data portion arrangements which require minimal to no computation to prepare for display can also be used.

At 108, a portion of the data set stored in memory, at least one element of said data set being represented by the graphical user interface element, is displayed on one or more graphical user interfaces. The displayed portion of the data set may correspond in some fashion to the value within the data set represented at the location (or locations) on the graphical user interface element where the activation signal was generated. The displayed portion of the data set may correspond, in whole or in part, to the arranged data set.

This may have applicability in various scenarios. For example, in a solution mining operation (i.e., a method of extracting underground potash reserves by injecting heated brine into a potash deposit in order to dissolve potash salts and then pumping the brine/potash solution out of the deposit in order to extract said potash salts), the data set stored in memory may contain data corresponding to various measurements taken by a multitude of sensors in a solution mine during operation. The data set stored in memory may include: values corresponding to the ratio of water to salt at various locations within the piping structure of the mine; the pressure of the water, brine solution, and expelled liquid; data corresponding to the temperature of liquids within the piping structure of the mine as well as the various components forming the mine structure; information about electrical draw, torque generated, revolutions per minute, and various other measurements of the machinery of the mine taken by sensors. The data set stored in memory may also contain information regarding the predicted values of all of these measurements according to an engineering model and/or historical data collected from various other solution mining operations.

In the embodiment of the previous paragraph, some or all of the content of the data set stored in memory may be presented to a user via a graphical user interface on a computer screen; however this voluminous data set would be of limited use to a user when viewed at once (e.g. in a large spreadsheet or table). Similarly, methods may display sub-sets of this data set to users; however this would not help said users to identify important trends and patterns within said sub-set where said patterns are only noticeable when compared with other sub-sets of data within the larger data set. In some instances, aspects of the present disclosure addresses these, and other, challenges by instructing a microprocessor to create one or more arranged data sets in response to an input signal generated by the user on the graphical user interface displaying a visualization of at least some of the data set (which may include portions of the data set that have undergone certain processes, calculations, transformations, etc. as described herein or otherwise).

In the embodiment of the previous paragraph, the arranged data set may contain information corresponding to, for example, data captured at a moment of time represented by the location on the graphical user interface corresponding to the received input signal. This arranged data set, for example a set of projected measurements corresponding to an engineering model of the above-mentioned solution mine, may be presented to the user in real time which may help the user to quickly detect anomalies.

Figure 2:
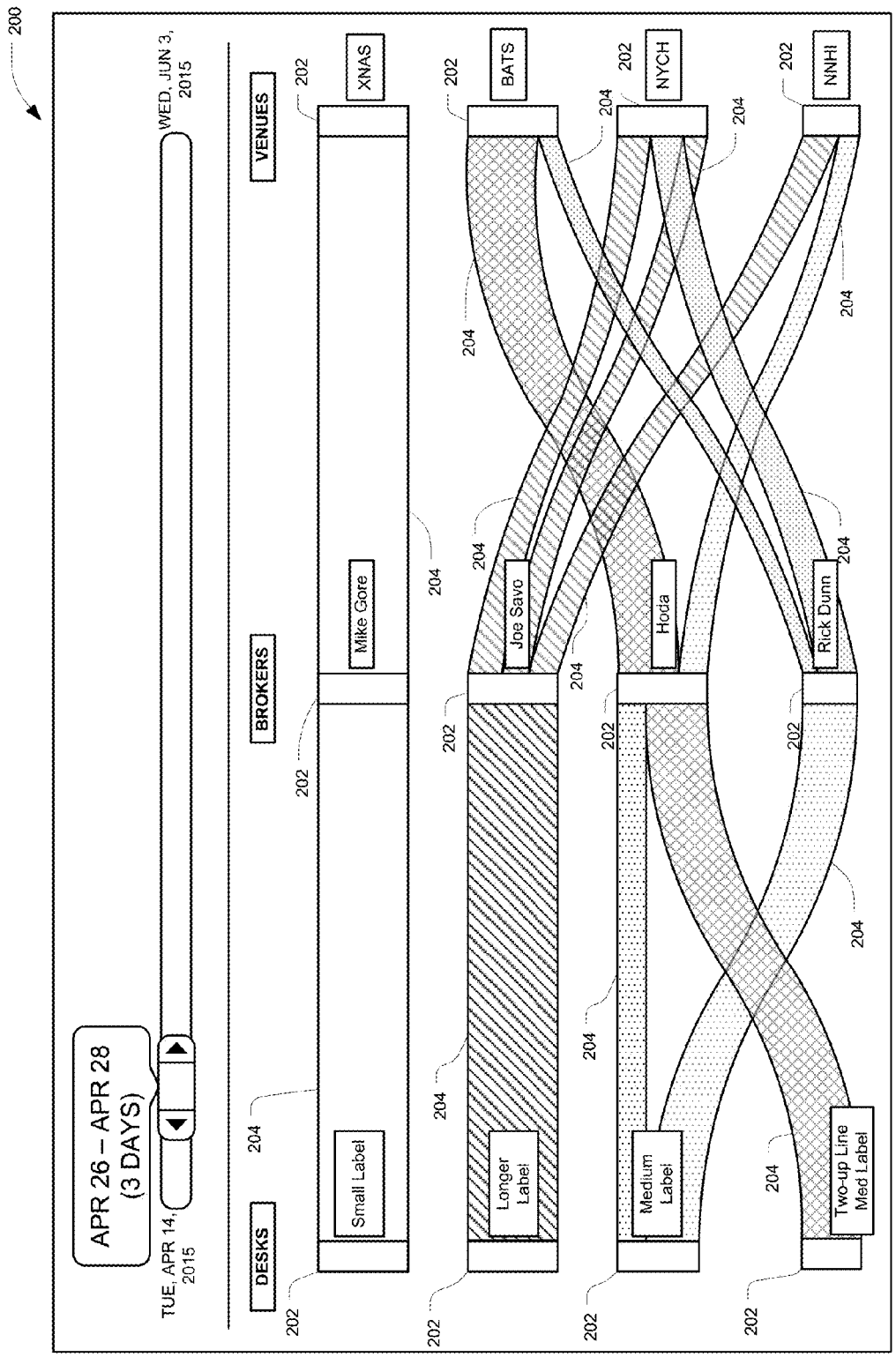
FIG. 2 illustrates a graphical user interface for visualization of data according to some embodiments.

In accordance with the present disclosure, and as depicted in the example visualization of FIG. 2, embodiments of the present disclosure may provide for data to be visualized by the computer system on the display as representative connections, or bands, between objects, or tiers, for example in a style of a Sankey diagram. Each object 202 visualized by the present disclosure may represent, for example, a location, destination, entity, component or node.

In an embodiment, objects 202 visualized by the methods, devices, and computer readable media of some embodiments of the present disclosure may exist in, for example, in a computer network. A connection between two objects 202 may represent some activity occurring between the objects 202, such as a transaction, or transfer of some kind. For instance, in the example shown in FIG. 2, objects are aligned vertically and grouped by object type, which for the purposes of the illustrative example of FIG. 2 includes desks, brokers, and venues.

Connections 204 between objects 202 may be represented by one or more lines, each having a particular thickness. The thickness of the line may represent the amount or volume of activity between the objects 202, proportionate to a defined scale. For example, each time object A (e.g., "Small Label" in FIG. 2) transacts with object B (e.g., "Mike Gore" in FIG. 2), the system of the present disclosure may increase the thickness of the lines depicting the connection 204 between objects A and B. The defined scale may also be configured to change over time as the amount of activity between the objects changes. For example, in the event that the activity between objects A and B increases by a factor of ten, a vast increase in the thickness of the lines depicting the connection 204 between objects A and B may be required in order to continue accurately depicting the volume of activity at a certain scaling factor. Increasing the thickness of the lines depicting the connection may cause other visual elements in the visualization to become obscured or hidden.

With regard to this technical challenge, the methods, devices and computer readable media of some embodiments may cause the graphical user interface to automatically modify the scaling factor used to depict objects and connections. In another embodiment, one or more objects or connections may be displayed using one or more dynamic scaling factors; the particulars of which may be automatically indicated and updated on the graphical user interface.

One or many connections 204 may be represented in the visualization between any number of objects. For example, object A may separately connect to a plurality of other objects. The thickness of each connection 204 between an object 202 and any other object 202 may represent the volume of activity between those specific respective objects 202. Each connection to object A may be visually represented stemming from object A with spaces above and below to visually separate each connection from another.

The visualization may be configured to show a single instant in time, to update in real-time or near-real-time, to playback data captured during an interval of time at some rate faster or slow than real-time, or to playback all or a portion of historical data. Accordingly, where the visualization is configured to update, connections 204 between objects 202 may change thickness, or new connections 204 may be formed, or may disappear if no activity occurs between the respective objects 202 at the respective time.

The time period shown at each instant of the visualization may also be varied. For example, the visualization may show aggregated visualized data for a single day at a time. In such an example case, playing the visualization forward or backward would increment or decrement the associated day represented by the visualization. The value of the visualization may be best realized when displaying instants of data for a day, week, month, or year. Optionally, the visualization may be configured to continuously or periodically be updated automatically as new data appears in the database, to always show only the last X number of hours or days of data. For example, the visualization may be configured to always show the last 24 hours' worth of data, or the last 3 days' worth of data. In the example visualization of FIG. 2, data for a three day period of Apr. 26, 2015, to Apr. 28, 2015 is visualized.

In some embodiments, it may also be possible to interact with the connections between objects in various ways. Optionally, the systems and methods of the present disclosure may provide for user interaction. In an embodiment, users may be able to interact with the visualization, for example the visualization shown in FIG. 3, to select only a particular object and its respective connections for visualization. Selecting a particular object or subset of data may allow for more detail about transactions associated with object A to be effectively displayed.

Figure 3:
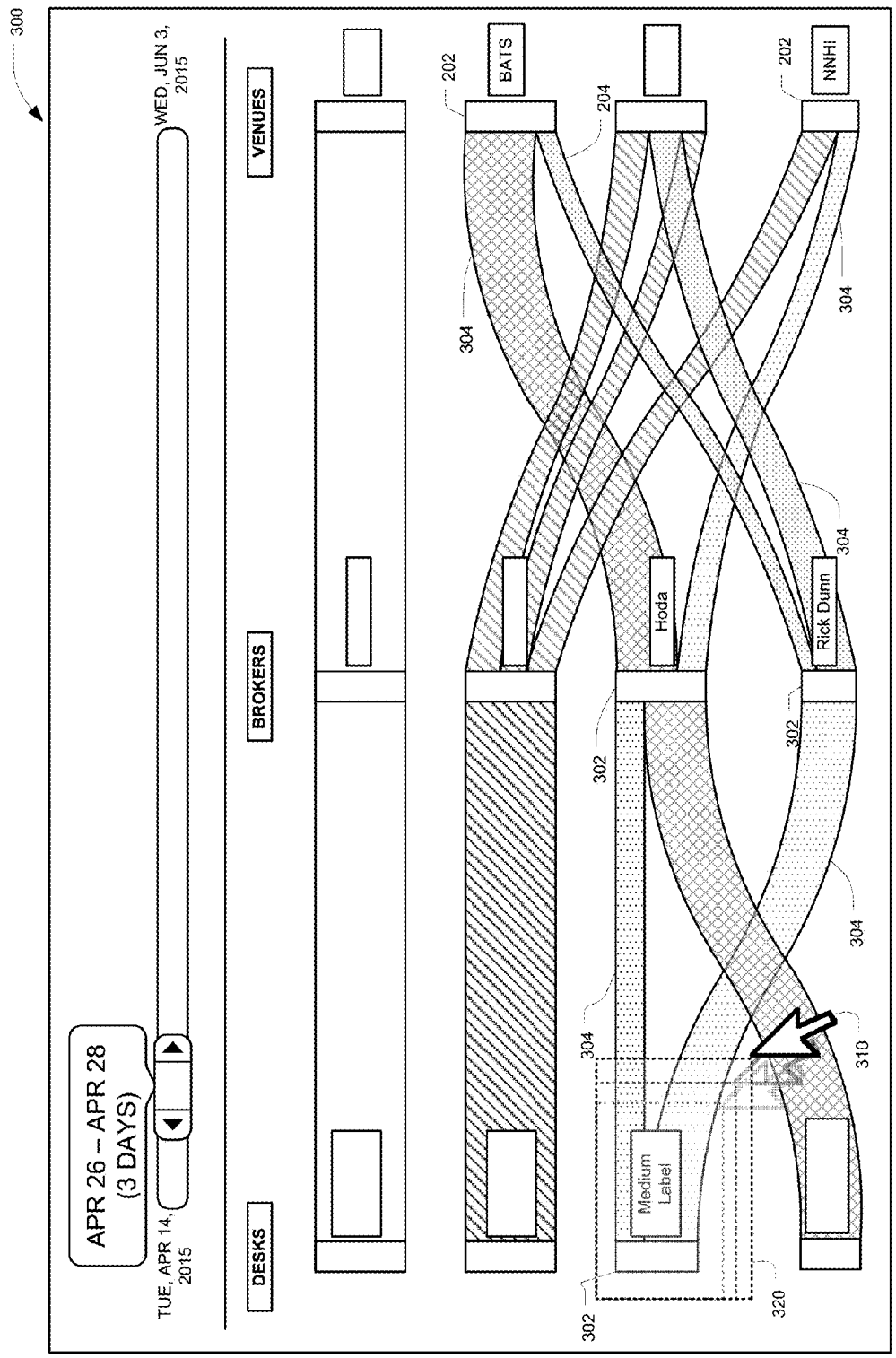
FIG. 3 illustrates a graphical user interface for visualization of data according to some embodiments.
Figure 4:
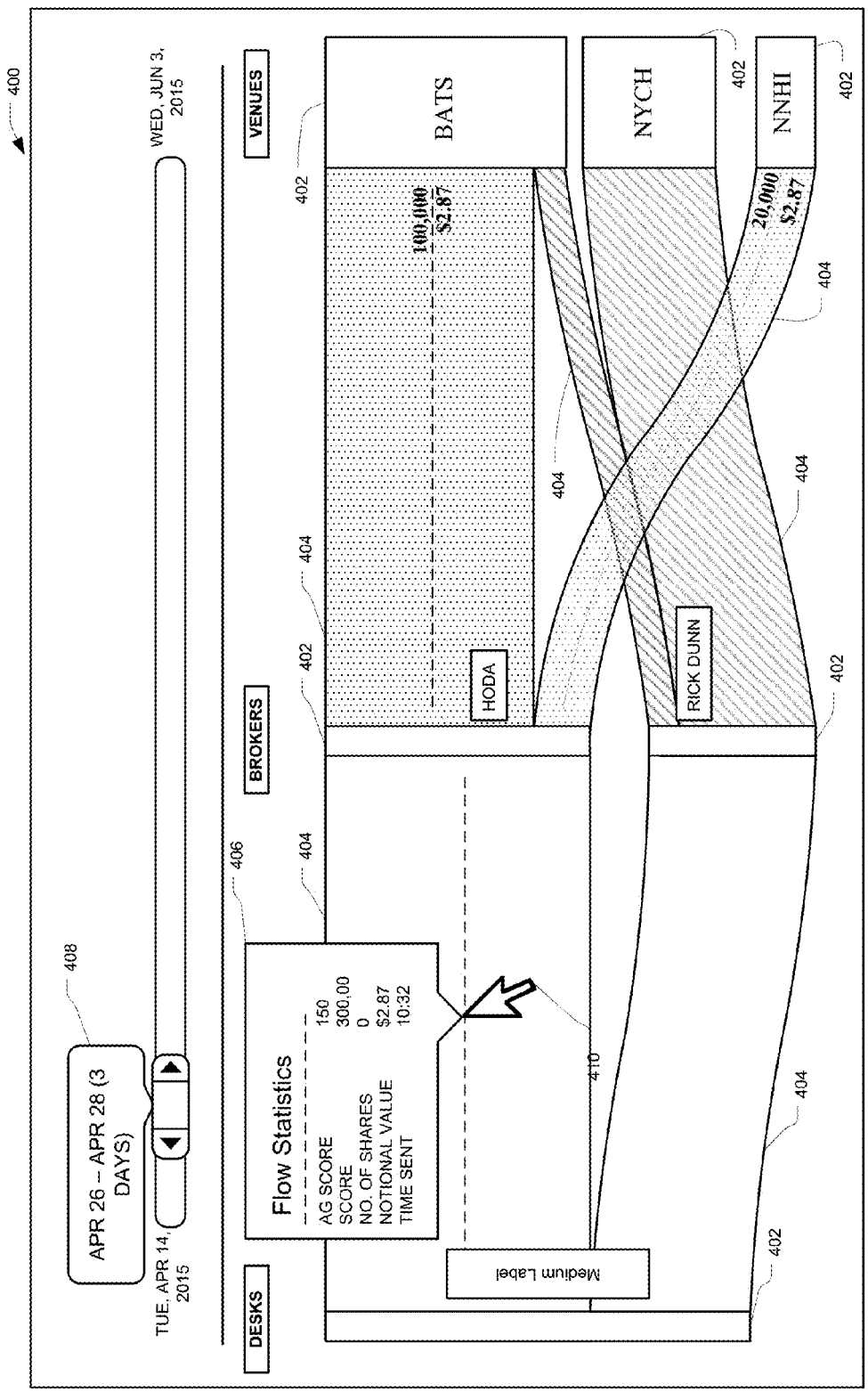
FIG. 4 illustrates a graphical user interface for visualization of data according to some embodiments.

For example, the example embodiment of FIG. 3 depicts a visualization 300 including objects 302 connected to one another by connections 304. In this example embodiment a cursor 310 is depicted drag selecting an area of the graphical user interface displaying the visualization 300 so that a drag-select box 320 contains an object 302 as well as portions of the connections 304 connected to said object 302. Selection of the object 302 and connections 304 in this fashion may, according to some embodiments, cause more detail about the object 302 and connections 304 to be effectively displayed. As a non-limiting example, drag selecting one or more objects 302 and connections 304 with a cursor 310, as depicted in FIG. 3, may cause a view such as is depicted in FIG. 4 to be displayed.

Each connection shown in a visualization may represent one or more values corresponding to activities that occurred during the time depicted in the visualization. With reference to the visualization of FIG. 2, each connection may have a top edge, a bottom edge, and a thickness or space between edges (e.g. a thickness, vertical or Y-axis dimension) that may be shaded by a particular color, tone, or pattern. The connection/dimension may be a straight connection between objects, or may be curved, bent or otherwise arranged in order to depict a connection to other objects, as shown. For example, hovering a mouse pointer, or other input, over a portion of the connection/dimension, may cause information associated with one or more events occurring at a point in, or span of, time corresponding to the particular moment in, or span of, time represented at that portion of the connection to be displayed above the hovered-over location, or elsewhere in the visualization.

In an embodiment, hovering a cursor over a portion near the top edge of a connection may present information about an activity occurring near the beginning of the time period being visualized by the visualization, while hovering over a portion of the connection near the bottom edge may present information about an activity occurring near the end of the time period being visualized. For instance, the vertical location between the top and bottom edges of a connection may represent the time of day while the horizontal location between the left and right edges of a connection may represent a calendar date.

In another embodiment, hovering a cursor over a portion approximately mid-way between the top and bottom edges of the connection could present information about an activity occurring around halfway between the beginning and end times of the visualization (e.g., at 12:00 noon where the time of the visualization was one day). Hovering elsewhere on the connection may present information about an activity that occurred at a point in time represented by the point closest to the hovered-over location.

In the embodiment of FIG. 4 an input device in the form of a mouse cursor 410 is depicted as generating an activation signal at a position above a connection 404 depicted as an element of visualization 400. In this non-limiting example, the activation signal is generated when as cursor 410 hovers over the graphical element representing a connection 404. As a result, the data visualization engine, according to an embodiment, causes information associated with one or more elements of the data set being visualized to be displayed in a sub-window 406 displayed above the hovered-over location. The data displayed in the sub-window may, for example, correspond to a portion of the visualized data set that represents data that was collected on a particular day and time of day associated with the particular location on the connection 404 above which the mouse cursor 410 is hovering.

As a non-limiting example, FIG. 4 depicts a mouse cursor 410 hovering above a connection depicting interactions between an object 402 which represents a particular trading or dealing desk labeled "Medium Label", and two objects 402 representing two brokers labeled "HODA" and "RICK DUNN". FIG. 4 further depicts connections 404 representing interactions between the aforementioned brokers and three objects 402 representing exchanges "BATS", "NYCH", and "NNHI". The figure depicts the interactions between said objects and connections between the dates 408 of Apr. 26, 2015 and Apr. 29, 2015.

Figure 5:
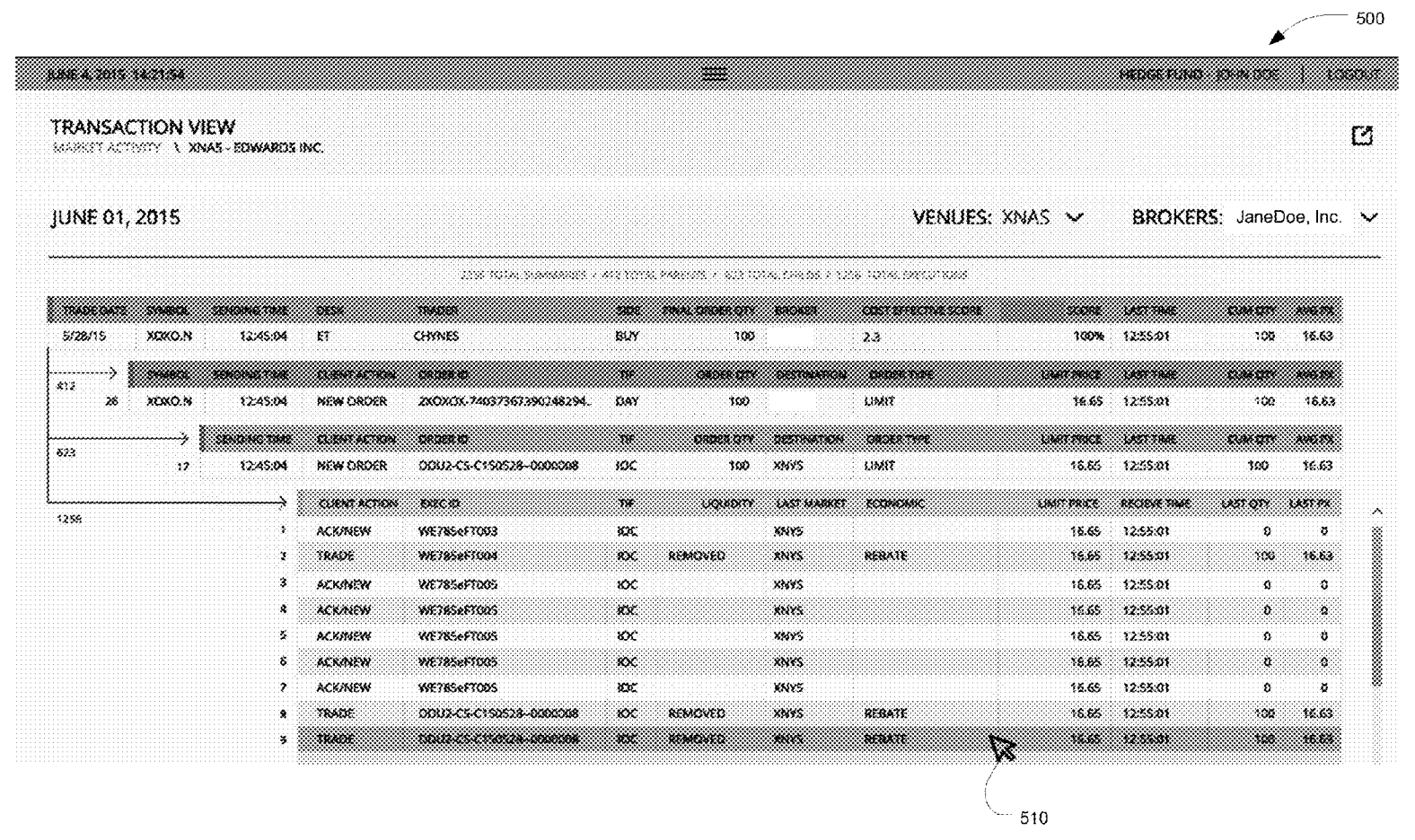

FIG. 4 further depicts a mouse cursor 410 generating an input signal by hovering above a connection 404 between objects 402 Medium Label and HODA. As a result, according to an embodiment of the present disclosure, a sub-window 406 is generated in the visualization 400 above the location of the mouse cursor 410. The sub-window displays information corresponding In some embodiments, in addition to, or separately from, the hovering functionality, selecting (e.g., by clicking a mouse cursor or tapping a touchscreen) a portion of the connection may present a list of all or a subset of the data records, or some arranged visualization of data related thereto, represented by the respective connection. Optionally, only the particular transaction record identified by the hovering functionality may be presented. Depending on where on the connection the activation signal was generated, the subset of data records that may be displayed may be limited to the respective data entry (and/or set of data entries/grouping) representing information that is visualized by a specific portion of the connection. According to some embodiments, FIG. 5 may show visualization 500 of a particular transaction that was selected for viewing.

By using some or a combination of the described functions, it may be possible for a user to more quickly compare activities of respective objects, notice areas of interest or anomalies with respect to other objects, and access relevant portions of the data of particular objects. Therefore, embodiments of the present disclosure may provide the user with the ability to quickly zoom in on a particular starting point of the data, to scan or "flip" through that portion or subset of the data without having to scroll through the entire data set in the hopes of locating data of interest.

Examples of analytics endeavours to which the present disclosure may be applied to provide a visualization thereof, may include, but are not to be limited to: power distribution; water distribution; traffic flow; trading activity, such as for stocks or other financial instruments which may be traded; online sales activity (e.g., sales from an online website); ticket sales; attendance at an event, workplace, school, or other location; and polling data.

In an example embodiment of trading financial instruments, hovering over a portion of the connection between objects may show an order to trade a financial instrument and a time of the order. Moving the mouse to hover over other portions may show other orders associated with the respective represented times of those portions. Clicking on the hovered-over portion may zoom into a list of orders, automatically scrolled to the position of the hovered-over order. Clicking on a particular object, which in this case may represent a broker of financial instruments, may show only activities or connections associated with the broker. In some embodiments, the input signal (e.g., clicking of a mouse) may trigger a zoom function that may cause a zoomed in portion of the area containing orders or connections to be displayed in more detail; this zoom function may be repeated at different zoom-factors upon detection of subsequent input signals (e.g., a first activation signal may generate a zoom factor of 10×, a subsequent second activation signal may generate a zoom factor of 50×).

In another embodiment, a single object visualized by the methods, devices, and computer readable media of the present disclosure as a node in the left-most column may represent an automobile engine. One or more objects visualized as nodes in a right column may represent features of an automobile (e.g., motive power, transmission, energy to wheels, braking, heating/cooling system, etc.). Connections between the objects may represent the transfer of fuel-energy from the engine to the various features of the automobile over a period of time. The thickness of the lines representing the connections between the objects may represent the amount of energy transferred from the engine to various components of the automobile at a given point in time. The visualization may display historical data and/or may display data as it is captured in real time.

In the embodiment of the previous paragraph, by hovering an input (e.g., a mouse pointer) over a portion of the connection, information about the fuel energy transfer between the engine and the component at the other end of the connection at a particular point or period of time represented at that particular portion of the connection may be displayed above the hovered-over location, or elsewhere in the visualization. For example hovering over a particular portion of the connection may cause certain data about the transfer of fuel energy between the engine and the heating/cooling system during a period of time corresponding to the location of the mouse cursor in relation to the connection.

In an embodiment of traffic flowing through a data network, various objects displayed by visualization may represent data servers related to an entity (e.g., a business) while other objects may represent other networked computer systems not directly related to the entity (e.g., internet exchange points or data servers belonging to other entities). Connections between the objects may represent interactions between the objects (e.g., transfers of data, requests, etc.) at a point in, or over a period of, time. The thickness of the lines representing the connections between objects may represent the amount and/or the frequency of the interactions between objects. The visualization may display historical data and/or may display data as it is captured in real time.

In the embodiment of the previous paragraph, hovering an input (e.g., a mouse pointer) over a portion of the connection may cause information about the interactions between the various devices represented by the visualization to be displayed above the hovered-over location, or elsewhere in the visualization. For example hovering a mouse cursor over a particular portion of the connection may cause certain information to be displayed about the type, amount, origin and/or destination of data transferred between two network servers during a period of time corresponding to the location of the mouse cursor. In the example embodiment of data traffic flowing through a data network, hovering a mouse cursor over a portion of the connection between objects (e.g., number of requests received at a point in time, origin of requesting server, ultimate known destination of routed packet, comparison between amount of traffic at the selected point in time and various averages, etc.) may cause information regarding the transfer of data between those two objects at a particular point in time corresponding to the position of the mouse cursor. Moving the mouse to hover over other portions may, in turn, cause information associated with the respective represented times of those portions to be displayed. Selecting (e.g., clicking on) the hovered-over portion of the connection may cause a zoomed-in view showing information specific to the network servers linked by the connection to be displayed. Clicking on a particular object, which in this embodiment may represent a particular computer server, may cause only the connections pertaining to network traffic flowing from or to the server represented by the particular object to be displayed.

In an embodiment, selecting a portion of a visualization (e.g., by click-and-drag selecting a horizontal portion of the connection, or selecting a location representing a grouping or range of values) may cause the system and method of the present disclosure to generate a visualization containing information relating only to those objects caught within the selected area. For example, using the example data network embodiment of the previous paragraph, a visualization may comprise a Sankey diagram containing 10 objects and 20 connections. Click-and-drag selecting an area within this visualization which contains 2 objects and 3 connections may generate and present to the user a new sub-visualization comprised of a Sankey diagram containing only the selected 2 objects and 3 connections.

Embodiments of the present disclosure may also have application where the tracked activity is localized to a particular object. Each object may have associated and presented therewith a bar, circle, sphere, or other representation of a varying size in accordance with activity associated with the respective object. Each object's visualized representation may change over time as the amount of the activity associated with the respective object changes.

Figure 6:
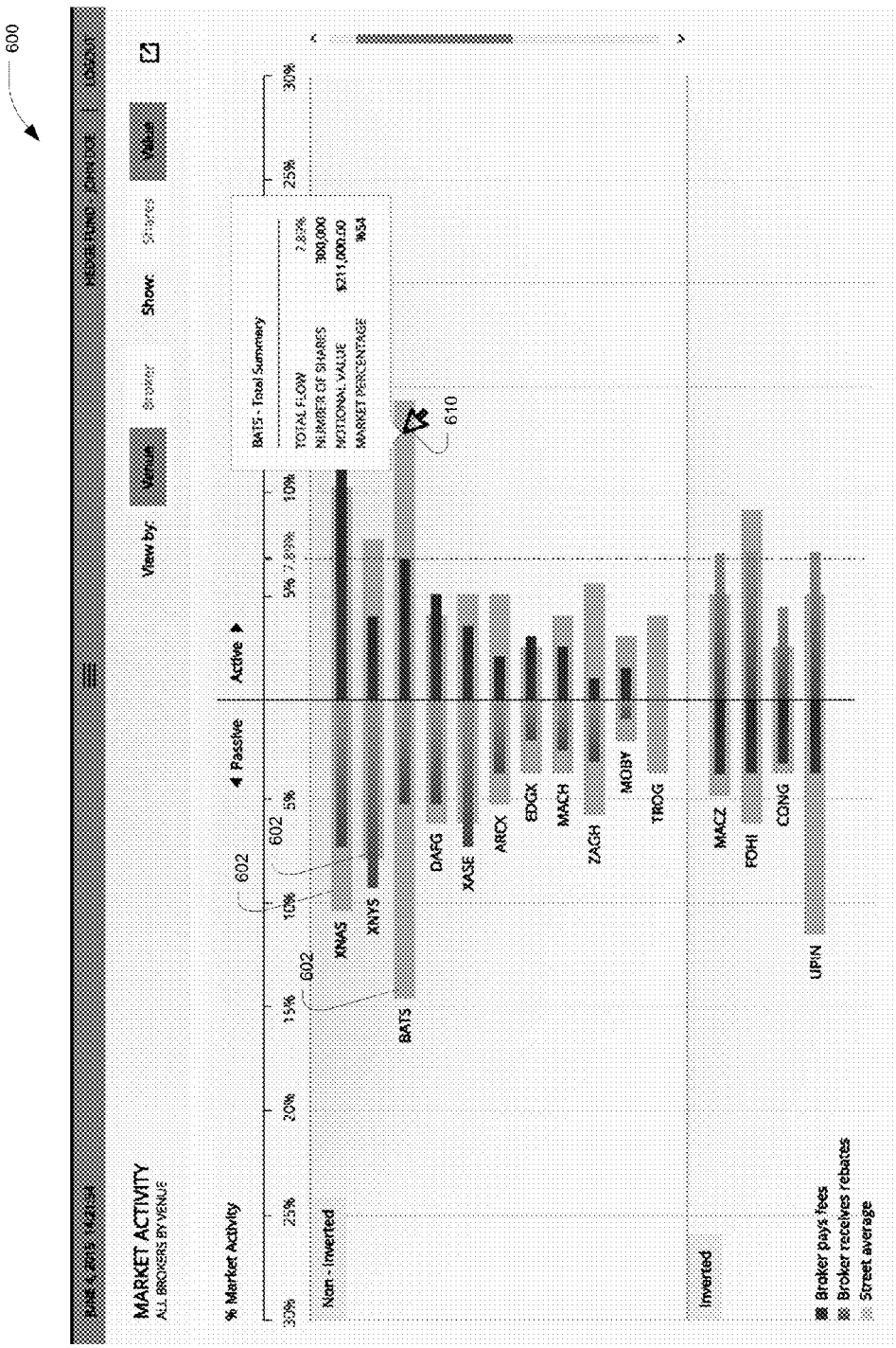
FIG. 6 illustrates a graphical user interface for visualization of data according to some embodiments.
Figure 7:
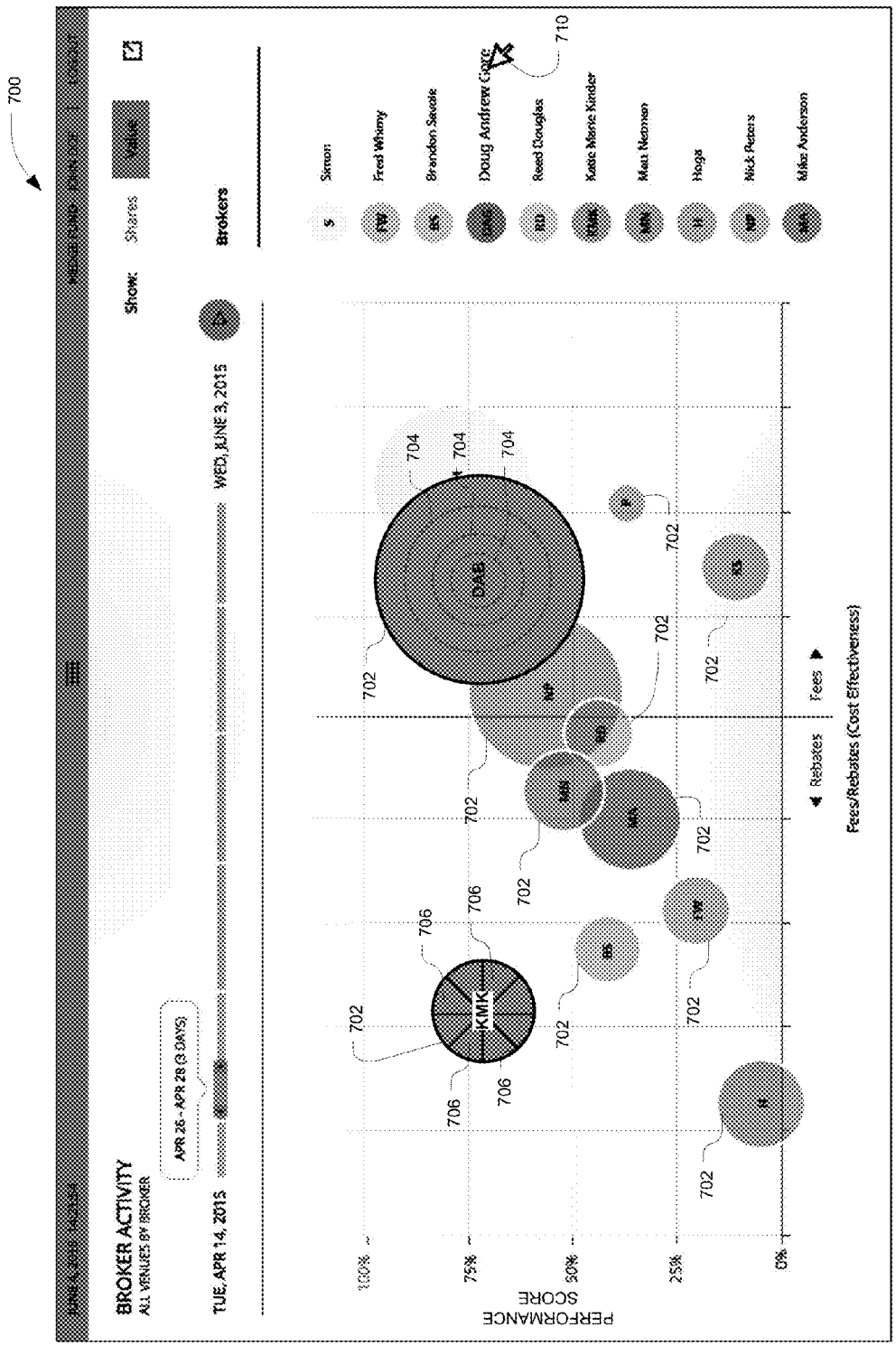
FIG. 7 illustrates a graphical user interface for visualization of data according to some embodiments.

FIGS. 6 and 7 show examples of other visualizations in accordance with aspects of the present disclosure. For example, in the histogram 600 shown in FIG. 6, each histogram bar 602 may be indicative of orders sequentially placed in time for the respective entity (or broker venue in this case). Moving the mouse pointer 610 horizontally along one of the histogram bar 602 indications may be used to view and select particular orders in time. In the example view of FIG. 7, each bubble 702 may also be interacted with to view and select particular orders in time. For example, by hovering the mouse pointer 710 near the center of one of the bubbles 702 as opposed to the outside of the bubble 702, a filter/selector may be applied which may cause different data, or the same data after having undergone certain data-analytics processes, to be displayed. Optionally, one or more concentric circles 704 may be visualized within each bubble 702 such that the size of any respective inner circle 704 may represent the portion of data represented by that bubble 702 that meets certain criteria.

In an example embodiment, a bubble 702 may represent the total quantity of orders placed by a particular broker. The inner concentric circles 704 may, respectively, represent the quantity of each order that was actually filled. In another embodiment each inner circle may represent the portion of orders placed by a broker. Causing an activation signal to be sent, for example by interacting with the inner circle 704 (e.g., by clicking or tapping it) may cause only the filled orders to be displayed, while clicking on the outer ring of the circle 702 may cause just the un-filled orders to be displayed. Depending on the underlying data, there could be any number of concentric rings (analogous to concentric tracks on an LP record) representing various attributes or properties of the data.

With particular regard to the analogy of concentric rings/tracks on an LP record, the user input device could, in some embodiments, be analogous to a record-needle. Further, the record itself may be analogous to a data set stored in memory that is displayed on a graphical user interface. The audio information stored in the grooves (or concentric circles) of the record and their transformation into audio patterns may, in some ways, be analogous to the creation of the arranged data set and its presentation to the user as a visualization. Note, however, that while a record player simply transforms audio information already imprinted in the groove, the data transformation engine and data presentation engine may perform multiple transformations of data and may combine said data with data from outside resources in order to present a useful arrangement.

In another example embodiment, the circumference of each bubble 702 may represent some value being visualized. For example, the circumference of each bubble 702 may correspond to the number of sales performed by a sales associate at a retail outlet on a particular day of the week. Optionally, each bubble 702 may also be interacted with to cause information about the respective sales associate's performance at a particular time or span of time to be displayed. For example, the bubble 702 may be divided radially into segments 706 representing hours within the shift of a sales associate. Hovering the mouse cursor 710 above a segment 706 may cause information corresponding to the span of time represented by each segment 706 to do displayed (e.g., a table displaying the sales representative's performance, the average performance of other sales associates within the retail outlet during that period of time, and the performance of each at similar times on other days).

It will be noted that embodiments of the present disclosure may allow for any visualization, including the embodiments described herein, to be displayed upon detection of an input signal within the area of a graphical user interface displaying a visualization or part thereof.

Figure 8:
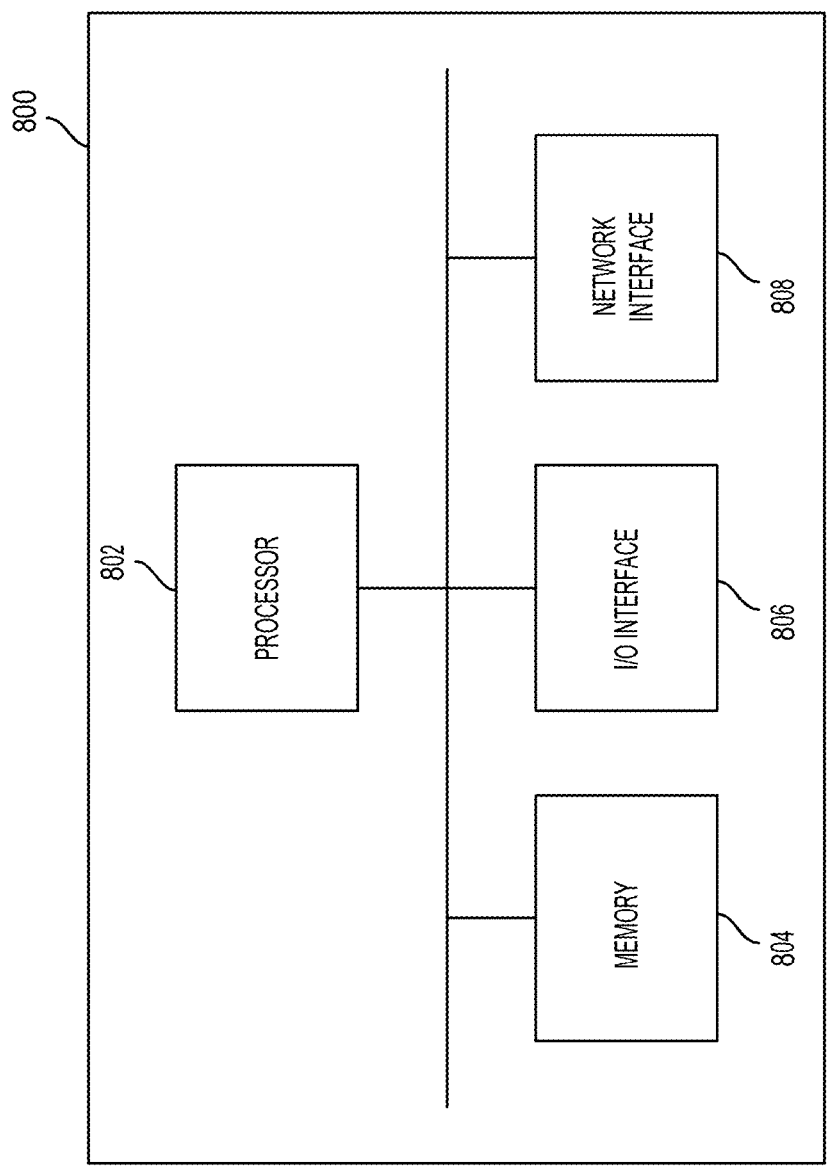
FIG. 8 is a schematic diagram of computing device for implementing the system according to an embodiment.

FIG. 8 is a schematic diagram of computing device 800, according to an embodiment. One or more of computing device 800, for example, may be used to implement system 200. As depicted, computing device 800 includes at least one processor 802, memory 804, at least one I/O interface 806, and at least one network interface 808.

Each processor 802 may be, for example, an x86 or x64 architecture processor, an ARM processor, or a microprocessor or microcontroller or combinations thereof.

Memory 804 may include a suitable combination of computer memory that is located either internally or externally such as, for example, random-access memory (RAM), read-only memory (ROM), compact disc read-only memory (CDROM), etc.

Each I/O interface 806 enables computing device 800 to interconnect with one or more input devices, such as a keyboard, mouse, camera, touch screen and a microphone, or with one or more output devices such as a display screen and a speaker.

Each network interface 808 enables computing device 800 to communicate with other components, to exchange data with other components, to access and connect to network resources, to serve applications, and perform other computing applications by connecting to a network (or multiple networks) capable of carrying data including the Internet, Ethernet, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these.

Figure 9:
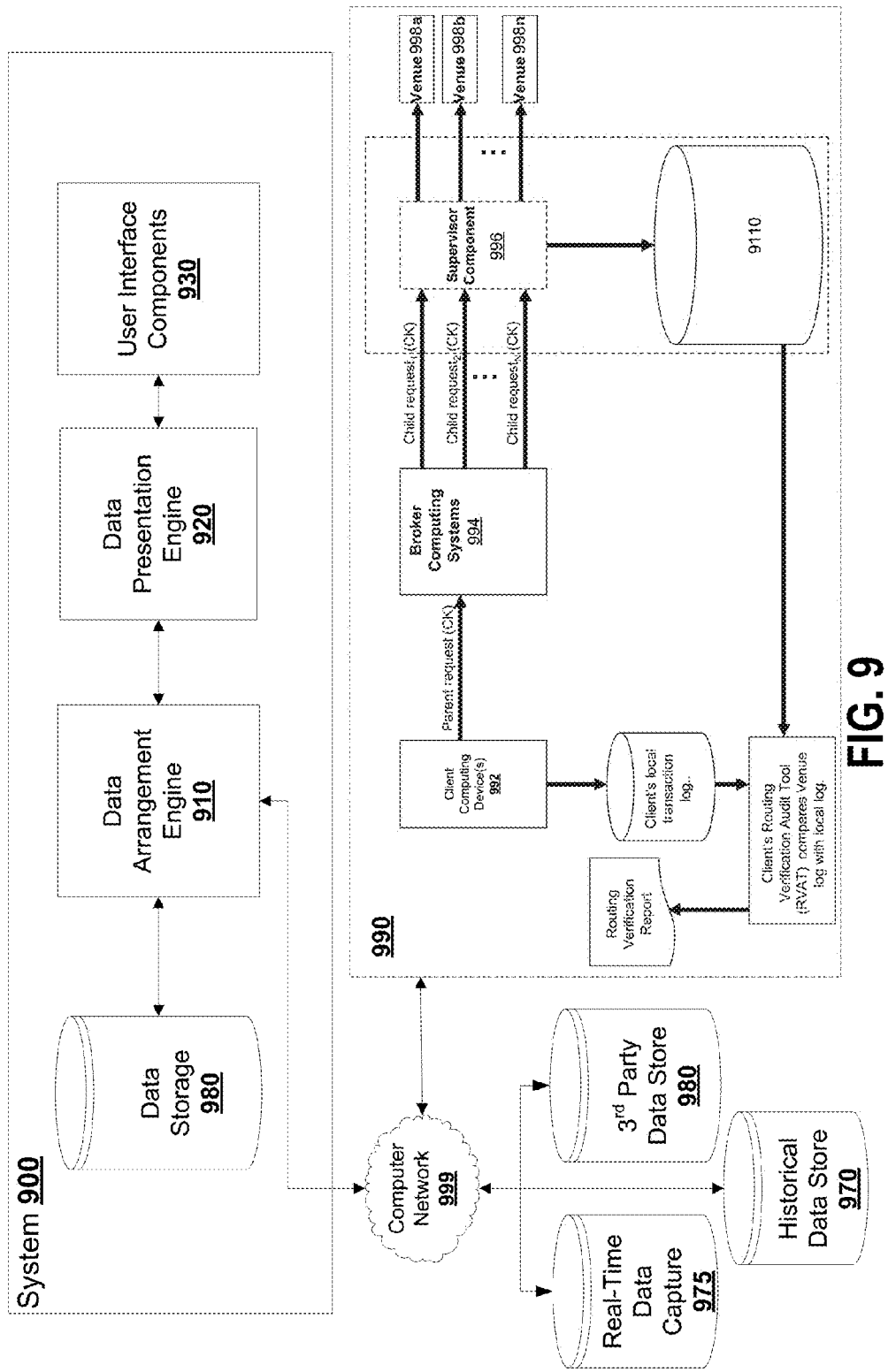
FIG. 9 is a depiction of a system for visualization of data according to some embodiments.

FIG. 9 is illustrative of a sample system 900 configured for presenting dynamic visualizations in accordance with some embodiments. The system 900 may, for example, be located in various environments, depending on architecture and topologies. For example, system 900 may reside directly on an originating device or a target device, or on a third party server or networked distributed resources that are utilized to coordinate the transfer. Where a third party server or distributed resources are utilized, they may act as intermediary computing devices.

Components included in system 900 may include data transformation engine 910, a data presentation engine 920, user interface components 930, and data storage 980 among others. Data storage 980 may be a non-transitory computer readable medium configured to store state information of the original application for provisioning onto the duplicated application(s). Data storage 980 may store such information in the form of flat files, database records, linked lists, or in other data structures.

The data transformation engine 910 may be configured to receive the one or more input signals from the data presentation engine 920. As a non-limiting example, such input signals may originate when taps the touch-screen display of a computerized device at an area of the display corresponding to a certain portion of a depiction of a Sankey diagram. The data presentation engine 920 may associate certain information about the location on the screen where the tap signal was received (e.g., relative location on the screen, duration of tap, whether the tap formed part of a pattern of taps) with information about the Sankey diagram visualized on the screen at the time (e.g., where on the Sankey diagram the tap's location corresponds to). The data presentation engine 920 may, after associating this information, convey the associated information to the data transformation engine 910.

The data transformation engine 910, according to some embodiments, may then, according to a set of pre-programmed instructions forming part of the present disclosure, associate the received input signals with one or more values in a data set stored in data storage 980. Further, the data transformation engine 910 may automatically generate, according to the pre-programmed instructions, an arranged data set based on the one or more values in a data set stored in memory associated with the received one or more input signals. For example, where the input signals were generated by a doctor tapping a portion of a line graph depicting the pulse rate of a patient at a specific time during a medical procedure, the data transformation engine 910 may automatically generate an arranged data set including the blood pressure, heart rate, and various information about the procedure collected at the specific time-point corresponding to the input. Once the arranged data set has been created, the data transformation engine 910 may convey that information to the data presentation engine 920.

In accordance with some embodiments, the data transformation engine 910, in associating the received input signals with one or more values stored in data storage, may obtain said values stored in data storage from external data stores (970, 975, 980). This may be accomplished by communicating requests and receiving responses over a computerized data network 999; examples of such computerized data networks 999 include local area networks, wide area networks and the Internet. Examples of external data stores may include, but are not limited to, stores of proprietary 3$^{rd}$ party information 980 (e.g., trading flows), stores which capture certain data in real time as it is produced 975, and external data stores that contain historical data captured of a long period of time 970. The data transformation engine 910 may incorporate information from such external data stores in order to, for example, create visualizations in the form of tables that compare the trading volume between a broker and a certain exchange during a given period of time and with respect to a financial instrument to the trading volumes of one or more other brokers filling similar orders historically, over the same period of time, or in real-time (or near real-time).

Note external data stores may also refer to external systems which provide specific means for tracking, encoding/decoding, and otherwise manipulating data, in addition to simply storing it, in order to provide additional functionality such as tracking, verification or management of data processes. A system for verifying or otherwise managing data processes 990 may be one such system according to some embodiments.

The data presentation engine 920 may function to communicate data to users through a user interface device and to communicate input received from users to the data transformation engine 910. In an embodiment, the data presentation engine 920 may associate signals from one or more user interface components with at least one element of one or more data visualizations (those visualizations, in turn, representing depictions of stored data to users through a user interface device). For example, the data presentation engine may function to associate input in the form of a click and drag operation executed by a user with a mouse with certain user interface elements depicting parts of a chart or graph on a computer screen. The data presentation engine 920 may determine which objects were selected by the click and drag operation and then designate those objects as having been selected by the user. The data presentation engine 920 may, according to some embodiments, transmit this associated data to the data transformation engine 910.

The data presentation engine 920, according to some embodiments, may also receive arranged data sets from the data transformation engine and generate data visualizations based on those arranged data sets. For example, continuing with the medical procedure example above, the data transformation engine 910 may generate an arranged data set including the blood pressure, heart rate, and various information about the procedure collected at the specific time-point corresponding to the received input. The data presentation engine 920 may the function to transform that raw data into a presentable form of data visualization (e.g., a set of tables, charts, or a zoomed-in or zoomed-out form of the original visualization) so that the user can more easily identify and absorb the arranged data. According to some embodiments, the data presentation engine 920 may also function to transmit data visualizations to the one or more user interface components.

In some embodiments, the data transformation engine 910 may interact with external systems to provide additional functionality such as tracking, verification or management of data processes. This may include, but is not necessarily limited to, tracking, monitoring, and verification of financial orders or requests that have been routed, or are being routed, for processing by various networked computer resources. An illustrative, but non-limiting, example of such a system to provide tracking, verification and/or management of data processes is disclosed in U.S. patent application Ser. No. 14/969,896, filed Dec. 15, 2015 and entitled "VERIFICATION OF DATA PROCESSES IN A NETWORK OF COMPUTING RESOURCES", which is hereby incorporated by reference.

For example, an electronic trading data processing request can include interest identifier(s) (such as an identifier used by one or more exchanges to identify a stock, a Committee on Uniform Securities Identification Procedures (CUSIP), a set of currencies to be exchanged, etc.), a quantity value (e.g., amounts or volumes) of the interest(s) to be transacted (including for example any total and/or reserve quantities), an execution type (e.g., buy, sell, bid, offer, etc.) to be executed or requested, time-in-force (e.g., good-til-canceled, immediate or cancel, fill or kill), and corresponding price terms. In some examples, the data processing request may include data indicating specific requirements and/or preferences for executing the data process such as preferred or required computing resources to use, limits on number of child data processes that can be generated from the original request, routing instructions, timing parameters, and any other instructions for executing the data process and/or instructing an intermediary system.

For example, a visualization may, according to embodiments of the present disclosure, provide for visualization of electronic trading data. Upon receiving an input from a user corresponding to an element of a visualization corresponding to one or more orders for financial instruments made by a broker, the methods of the present disclosure may provide for the one or more orders to be tracked, and information relating to the subsequent routing of said orders to be displayed to the user. This may be accomplished by transmitting certain information about the request from the data transformation engine 910 to a system for verifying or otherwise managing data processes 990.

Continuing the example embodiment of the previous paragraph, in some embodiments the request sent to the system for verifying or otherwise managing data processes 990 can include interest identifier(s) (such as an identifier used by one or more exchanges to identify a stock, a Committee on Uniform Securities Identification Procedures (CUSIP), a set of currencies to be exchanged, etc.), a quantity value (e.g., amounts or volumes) of the interest(s) to be transacted (including for example any total and/or reserve quantities), an execution type (e.g., buy, sell, bid, offer, etc.) to be executed or requested, time-in-force (e.g., good-til-canceled, immediate or cancel, fill or kill), and corresponding price terms. In some examples, the request may include data indicating specific requirements and/or preferences for executing the data process such as preferred or required computing resources to use, limits on number of child data processes that can be generated from the original request, routing instructions, timing parameters, and any other instructions for executing the data process and/or instructing an intermediary system.

According to some embodiments, the system for verifying or otherwise managing data processes 990 can include one or more instructor systems such as the client computing systems 992. An instructor system 992 can include one or more instructor (client computing) devices configured for transmitting a data processing request (for example, a parent request) to a second system (for example, broker computing systems 994). The data processing request can, in some examples, be executed by one or more computing resources (for example, electronic trading venues 998a . . . n).

In some embodiments, request can be a request or other message which includes data including one or more parameters or requirements defining the data process that the instructor system 992 seeks to have executed. The instructor system 992 may also be configured to maintain a transaction log (e.g., held within a database or various computer readable data storage devices).

According to some embodiments there may be an intermediary system configured to receive the data processing request from the instructor system 992; generate one or more child requests, each for executing at least a portion of the received data processing request; and routing the child request(s) for execution by one or more computing resources. In some embodiments, the intermediary system may be an electronic broker, a distributed resource management system, or any other system or device which may act as an intermediary, agent, proxy or node for having the data processing request executed.

Further to the embodiment of the previous paragraph, in a client-broker-venue financial trading application, the system may comprise, for example, a client system, a broker system (intermediary), a supervisor system and one or more venues (data processing resources for financial trading). A client system may submit a request to a broker system for one or more financial transactions to occur. The client request may be denoted as a parent request, which may be transmitted to a broker system, which may be configured to provide one or more related child requests to cause the routing of one or more financial transactions. The client request may be transmitted to a broker system, which then provides one or more related child requests to cause the routing of one or more financial transactions.

In some embodiments, in order to verify, manage, and/or track data processes corresponding to parent and child orders/requests, the supervisor system may be configured to maintain a public database of encoded (child) orders, which may be indexed (e.g., using an Anonymous Index (AI)). In an embodiment, encoded orders may be listed and retrieved by anyone, but require a copy of the key X, or corresponding decoding key, to decrypt. Optionally, a secure login process may be provided to allow only registered users of the supervisor server to query and retrieve any of the orders.

Further to the embodiment described in the previous paragraph, the data transformation engine may send data taking the form of one or more identifiers corresponding to orders sent to a broker or brokerage to a system for verifying or otherwise managing data processes 990 in order to create an arranged data set (perhaps including a trace of the routing of one or more portions of an order filled by a broker) to be visualized. The system for verifying or otherwise managing data processes 990 may maintain a public database of encoded (child) orders, which may be indexed (e.g., using an Anonymous Index (AI)). The encoded orders may be listed and retrieved by anyone, but may require a copy of the key X, or corresponding decoding key, to decrypt. Optionally, a secure login process may be provided to allow only registered users of the supervisor server to query and retrieve any of the orders.

In order to allow the client to verify/trace the broker's activities, the broker may share its complete encoding keys and any related secure information with the client. In some embodiments, particularly where only one key is shared between broker and client, the client, using the information provided by the broker, may then be able to regenerate a sequence of hashed child keys used by the broker in order to determine which child orders were made from the original parent order. The client may regenerate the child keys using the same process used by the broker to generate the child keys, where the client knows the broker's key, or the client's key in the case of where the client's key was originally shared with the broker, and the hashing algorithm used by the broker. The client may also be able to determine which child orders were related to which other child orders using this process.

It should be understood that the term "system" as referenced for example as instructor systems, intermediary systems, supervisor systems, client computing systems, broker computing systems, etc. may refer to one or more devices, systems, communication links, or some combination thereof. In some examples, a single physical device may include aspects of multiple systems, for example, a single computing device may running a data process for a first system, and also host a server for a second system.

Conversely, the term "device" or "server" can refer to a single device, multiple devices, communication links, systems, computer process, or any combination thereof.

The terms "instructor", "intermediary" and "destination" systems and devices refer to the relationships between the various components in the overarching system. For example, a broker computing system 994 may be an intermediary system for a client instructor computing system 992; however, for a multi-hop process, the broker computing system 994 can also be an instructor system that sends a request to an intermediary second broker system. Similarly, the second broker system can be a destination device from the perspective of the instructor system, and may also act as an intermediary for the first broker system.

In some embodiments, instructor, intermediary, destination and supervisor systems and devices may refer to electronic components within a single system such as the broker computing system 994. For example, as described herein or otherwise, the broker computing system may include multiple internal computing components such as smart routers which may be referred to as instructor, intermediary, destination and/or supervisor systems/devices.

Figure 10:
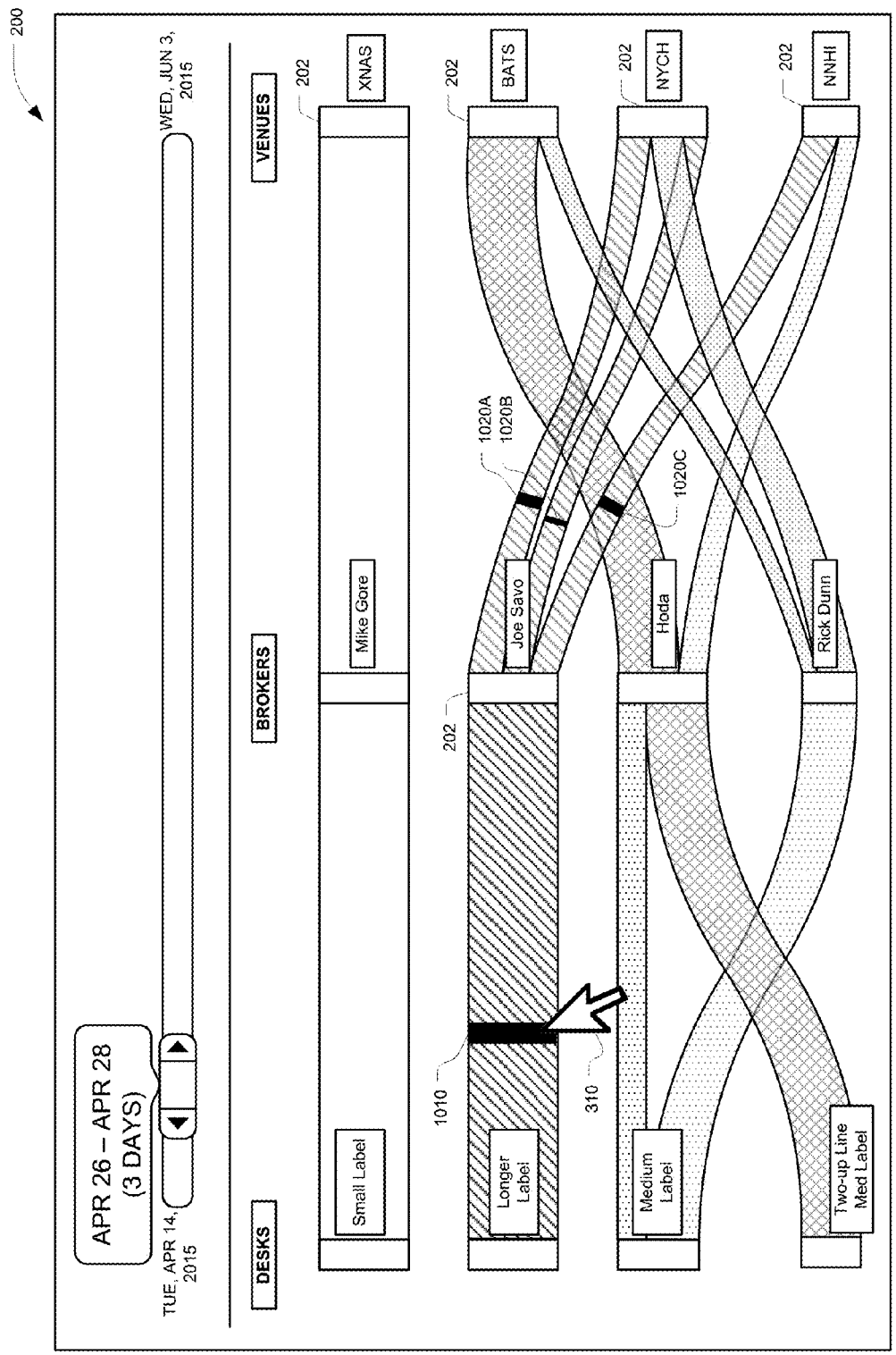
FIG. 10 illustrates a graphical user interface for visualization of data according to some embodiments.

FIG. 10 shows an example graphical user interface including a Sankey diagram. In some embodiments, when an activation signal is received at a position on an graphical user interface element, displaying the portion of the data set associated with the position includes displaying another graphical user interface element, highlighting or otherwise displaying a visual indicator 1010 on the graphical user interface of the one or more aspects of the graphical user interface associated with the portion of the data set. For example, in FIG. 10, an activation signal is received at a position at the cursor 310, and a visual indicator 1010 (i.e. portion highlighted in black) is displayed on the graphical user interface element which visually illustrates the portion of the arranged data set corresponding to the position.

In some embodiments, upon receiving the activation signal at a position at the cursor 310, visual indicators 1020A, 1020B, 1020C are displayed on one or more graphical user interface elements. For example, in FIG. 10, the arranged data portion illustrated by the visual indicator 1010 corresponds to the position of the activation signal; however, this arranged data portion also corresponds to visual indicators 1020A, 1020B and 1020C as the flow portion indicated by indicator 1010 flows is splits into three small flows at the Joe Savo Broker branch.

In this manner, in some instances, this arrangement and visual representation of the data portion and associated flows provides an intuitive and efficient visualization of the flows and their related flow portions.

Similarly, instead of receiving an activation signal at the visual indicator 1010, in another example, if the activation signal is received at a location at the visual indicator 1020C, the device is can be configured to display the visual indicators 1010, 1020A and 1020B. In this manner, related flow portions can be visualized irrespective of the which related portion which is directly associated with the location of the activation signal.

In some embodiments, generating the arranged data set includes associating portions of the data set with positions along different flows of a user interface element of a Sankey diagram or other similar visual representation of data.

Aspects of the systems and methods described herein may be applied in various fields, for example, financial trading.

It is to be understood that the present disclosure is not limited in its application to the details of construction and to the arrangements of the components set forth in the description or illustrated in the drawings. The present disclosure is capable of other embodiments and of being practiced and carried out in various ways. Also, it is to be understood that the phraseology and terminology employed herein are for the purpose of description and should not be regarded as limiting. In the drawings, embodiments of the present disclosure are illustrated by way of example. It is to be expressly understood that the description and drawings are only for the purpose of illustration and as an aid to understanding, and are not intended as a definition of the limits of the present disclosure.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the present disclosure.

What is claimed is:

1. A computer-implemented method for dynamically presenting graphical and textual information in a graphical user interface, the method comprising:
    displaying a graphical user interface element along a first dimension of the graphical user interface, the graphical user interface element visually representing a data set stored in memory;
    receiving an activation signal at a position along the first dimension of the graphical user interface element; and
    upon receiving the activation signal, displaying at least a portion of the data set based on the position along the first dimension at which the activation signal was received; wherein the graphical user interface element is a flow bar of a Sankey diagram; and the first dimension is a distance along a curve of the flow bar.

2. The method of claim 1, further comprising:
    receiving the data set stored in memory; and
    generating an arranged data set based on at least one attribute of the received data set to be associated with the first dimension of the graphical user interface element.

3. The method of claim 2, wherein at least one attribute of the arranged data set is buffered in memory.

4. The method of claim 3, wherein the arranged data set comprises a subset of values from the data set stored in memory.

5. The method of claim 4, wherein the subset of values from the data set stored in memory corresponds to a set of one or more values associated with the position along the first dimension of the graphical user interface element.

6. The method of claim 1, further comprising:
associating portions of the data set with portions of the graphical user interface element segmented along the first dimension.

7. The method of claim 6, further comprising:
generating portion display data associated with respective portions of the data set, the portion display data associated with respective portions of the graphical user interface element.

8. The method of claim 1, further comprising:
displaying the graphical user interface element along the first dimension and a second dimension of the graphical user interface;
receiving an activation signal at a position along the first dimension and the second dimension of the graphical user interface element; and
upon receiving the activation signal, displaying at least the portion of the data set based on the position along the first dimension and the position along the second dimension at which the activation signal was received.

9. The method of claim 8, further comprising:
receiving the data set stored in memory; and
generating an arranged data set based on at least two attributes of the received data set, each of the at least two attributes to be associated with at least one of the first dimension or the second dimension of the graphical user interface element.

10. The method of claim 8, wherein the second dimension is a distance along a width of the flow bar.

11. The method of claim 1, wherein the graphical user interface element includes at least one of a circle chart, a bubble chart, a line graph, and a bar graph.

12. The method of claim 1, wherein the first dimension is based on at least one dimension of a Cartesian coordinate system or a polar coordinate system.

13. The method of claim 1, further comprising:
receiving a second activation signal at a second position along the first dimension of the graphical user interface element;
displaying a second graphical user interface element, the second graphical user interface element visually representing at least a portion of associated with the second position along the first dimension at which the second activation signal was received.

14. A computing device configured for dynamically presenting graphical and textual information in a graphical user interface, the computing device comprising:
a display interface for interconnecting with a display device;
at least one memory; and
at least one processor configured to:
display, via the display interface, a graphical user interface element along a first dimension of the graphical user interface, the graphical user interface element visually representing a data set stored in the at least one memory;
receive an activation signal at a position along the first dimension of the graphical user interface element; and
upon receiving the activation signal, display, via the display interface, at least a portion of the data set based on the position along the first dimension at which the activation signal was received; wherein the graphical user interface element is a flow bar of a Sankey diagram; and the first dimension is a distance along a curve of the flow bar.

15. The computing device of claim 14, wherein the at least one processor is configured to:
display the graphical user interface element along the first dimension and a second dimension of the graphical user interface;
receive an activation signal at a position along the first dimension and the second dimension of the graphical user interface element; and
upon receiving the activation signal, display at least the portion of the data set based on the position along the first dimension and the position along the second dimension at which the activation signal was received.

16. The computing device of claim 15, wherein the second dimension is a distance along a width of the flow bar.

17. The computing device of claim 14, wherein the first dimension is based on at least one dimension of a Cartesian coordinate system or a polar coordinate system.

18. The computing device of claim 14, wherein the at least one processor is configured to:
receive a second activation signal at a second position along the first dimension of the graphical user interface element; and
display a second graphical user interface element, the second graphical user interface element visually representing at least a portion of associated with the second position along the first dimension at which the second activation signal was received.

19. A computer-readable medium or media having stored thereon machine-interpretable instructions for dynamically presenting graphical and textual information in a graphical user interface, when executed, the instructions configure at least one processor for:
displaying a graphical user interface element along a first dimension of the graphical user interface, the graphical user interface element visually representing a data set stored in memory;
receiving an activation signal at a position along the first dimension of the graphical user interface element; and
upon receiving the activation signal, displaying at least a portion of the data set based on the position along the first dimension at which the activation signal was received; wherein the graphical user interface element is a flow bar of a Sankey diagram; and the first dimension is a distance along a curve of the flow bar.

* * * * *

UNITED STATES PATENT AND TRADEMARK OFFICE
CERTIFICATE OF CORRECTION

PATENT NO. : 9,922,436 B2
APPLICATION NO. : 15/284440
DATED : March 20, 2018
INVENTOR(S) : Philip Iannaccone, Walter Michael Pitio and James Brown It is certified that error appears in the above-identified patent and that said Letters Patent is hereby corrected as shown below:

In the Claims

Column 25 Line 43 (Claim 13):
"displaying a second graphical user interface element, the second graphical user interface element visually representing at least a portion of associated with the second position along the first dimension at which the second activation signal was received."
Should read:
-- displaying a second graphical user interface element, the second graphical user interface element visually representing at least a portion of the data set associated with the second position along the first dimension at which the second activation signal was received. --

Signed and Sealed this
Nineteenth Day of June, 2018

Andrei Iancu
*Director of the United States Patent and Trademark Office*